United States Patent
DeSimone et al.

(10) Patent No.: US 9,755,273 B2
(45) Date of Patent: Sep. 5, 2017

(54) ION CONDUCTING FLUOROPOLYMER CARBONATES FOR ALKALI METAL ION BATTERIES

(71) Applicants: The University of North Carolina at Chapel Hill, Chapel Hill, NC (US); The Regents of the University of California, Oakland, CA (US)

(72) Inventors: Joseph M. DeSimone, Los Gatos, CA (US); Ashish Pandya, Morrisville, NC (US); Dominica Wong, Carrboro, NC (US); Nitash P. Balsara, El Cerrito, CA (US); Jacob Thelen, Berkeley, CA (US); Didier Devaux, Berkeley, CA (US)

(73) Assignees: The University of North Carolina at Chapel Hill, Chapel Hill, NC (US); The Regents of the University of California, Oakland, CA (US)

( * ) Notice: Subject to any disclaimer, the term of this patent is extended or adjusted under 35 U.S.C. 154(b) by 0 days.

(21) Appl. No.: 14/779,460

(22) PCT Filed: Mar. 31, 2014

(86) PCT No.: PCT/US2014/032363
§ 371 (c)(1),
(2) Date: Sep. 23, 2015

(87) PCT Pub. No.: WO2014/204547
PCT Pub. Date: Dec. 24, 2014

(65) Prior Publication Data
US 2016/0043435 A1    Feb. 11, 2016

Related U.S. Application Data

(60) Provisional application No. 61/807,084, filed on Apr. 1, 2013, provisional application No. 61/812,022, filed on Apr. 15, 2013.

(51) Int. Cl.
H01M 10/0565    (2010.01)
H01M 10/05    (2010.01)
(Continued)

(52) U.S. Cl.
CPC ....... H01M 10/0565 (2013.01); H01M 10/05 (2013.01); H01M 10/0564 (2013.01);
(Continued)

(58) Field of Classification Search
CPC ............. H01M 10/0565; H01M 10/05; H01M 10/0564; H01M 10/4235; H01M 10/0569;
(Continued)

(56) References Cited

U.S. PATENT DOCUMENTS 4,178,465 A    12/1979    Caporiccio et al.
4,360,645 A    11/1982    Krespan et al.
(Continued)

FOREIGN PATENT DOCUMENTS

AU    2003265336    2/2004
CN    100376602 C    3/2008
(Continued)

OTHER PUBLICATIONS

International Preliminary Report on Patentability Corresponding to International Application No. PCT/US2014/032363; Date of Mailing: Oct. 15, 2015; 8 Pages.
(Continued)

*Primary Examiner* — Jane Rhee
(74) *Attorney, Agent, or Firm* — Myers Bigel, P.A.

(57) ABSTRACT

Liquid or solid electrolyte compositions are described that comprise a homogeneous solvent system and an alkali metal salt dissolved in said solvent system. The solvent system may comprise a fluoropolymer, having one or two terminal
(Continued)

Maximum lithium salt concentration as a function of PFPE molecular weight.

carbonate groups covalently coupled thereto. Batteries containing such electrolyte compositions are also described.

20 Claims, 8 Drawing Sheets (51) Int. Cl.
  *H01M 10/0564*  (2010.01)
  *H01M 10/42*  (2006.01)
  *H01M 12/06*  (2006.01)
  *H01M 10/0569*  (2010.01)

(52) U.S. Cl.
  CPC ... *H01M 10/0569* (2013.01); *H01M 10/4235* (2013.01); *H01M 12/06* (2013.01); *H01M 2300/0034* (2013.01); *H01M 2300/0082* (2013.01)

(58) Field of Classification Search
  CPC ......... H01M 12/06; H01M 2300/0082; H01M 2300/0034
  See application file for complete search history.

(56) References Cited

U.S. PATENT DOCUMENTS

| | | | |
|---|---|---|---|
| 4,745,009 A | 5/1988 | Piacenti et al. |
| 5,011,751 A | 4/1991 | Yoneyama |
| 5,506,279 A | 4/1996 | Babu et al. |
| 5,612,043 A | 3/1997 | Deprez et al. |
| 5,618,316 A | 4/1997 | Hoffman et al. |
| 5,721,070 A | 2/1998 | Shackle |
| 5,725,802 A | 3/1998 | Chittofrati et al. |
| 5,777,174 A | 7/1998 | Marchionni et al. |
| 5,830,600 A | 11/1998 | Narang et al. |
| 5,900,500 A | 5/1999 | Turri et al. |
| 6,096,692 A | 8/2000 | Hagihara et al. |
| 6,190,574 B1 | 2/2001 | Nakagawa et al. |
| 6,413,676 B1 | 7/2002 | Munshi |
| 6,515,075 B1 | 2/2003 | Balogh et al. |
| 6,608,138 B2 | 8/2003 | Carignano et al. |
| 6,734,264 B1 | 5/2004 | Amin-Sanayei |
| 6,797,437 B2 | 9/2004 | Tsukamoto et al. |
| 6,844,134 B2 | 1/2005 | Choi et al. |
| 6,896,996 B2 | 5/2005 | Marchionni et al. |
| 6,958,256 B2 | 10/2005 | Rogalli et al. |
| 7,294,731 B1 | 11/2007 | Flynn et al. |
| 7,370,962 B2 | 5/2008 | Roffman et al. |
| 7,429,409 B2 | 9/2008 | Husemann |
| 7,476,468 B1 | 1/2009 | Lam et al. |
| 7,482,098 B2 | 1/2009 | Tsukamoto et al. |
| 7,608,600 B2 | 10/2009 | Storer et al. |
| 7,732,100 B2 | 6/2010 | Wakihara et al. |
| 7,790,312 B2 | 9/2010 | Costello et al. |
| 7,897,080 B2 | 3/2011 | Yang et al. |
| 7,989,566 B2 | 8/2011 | Coughlin et al. |
| 8,080,615 B2 | 12/2011 | Millward |
| 8,084,405 B2 | 12/2011 | Howell et al. |
| 8,133,580 B2 | 3/2012 | Dias et al. |
| 8,158,728 B2 | 4/2012 | DeSimone et al. |
| 8,197,943 B2 | 6/2012 | Pinto et al. |
| 8,337,986 B2 | 12/2012 | Moorlag et al. |
| 8,361,620 B2 | 1/2013 | Zang et al. |
| 8,409,177 B1 | 4/2013 | Lai |
| 8,475,688 B2 | 7/2013 | Chen |
| 8,802,301 B2 | 8/2014 | Halalay et al. |
| 9,540,312 B2 | 1/2017 | Teran et al. |
| 9,543,619 B2 | 1/2017 | Teran et al. |
| 2002/0127475 A1 | 9/2002 | Marchionni et al. |
| 2003/0027732 A1 | 2/2003 | Howell et al. |
| 2003/0215719 A1 | 11/2003 | Navarrini et al. |
| 2004/0141150 A1 | 7/2004 | Roffman et al. |
| 2009/0023038 A1 | 1/2009 | DeSimone et al. |
| 2009/0086408 A1 | 4/2009 | Koh et al. |
| 2009/0111019 A1 | 4/2009 | Hirose et al. |
| 2009/0134353 A1 | 5/2009 | Koh et al. |
| 2009/0291364 A1 | 11/2009 | Koh et al. |
| 2010/0047695 A1 | 2/2010 | Smart et al. |
| 2010/0183889 A1 | 7/2010 | Dams et al. |
| 2010/0216035 A1 | 8/2010 | Iwanaga et al. |
| 2010/0240912 A1 | 9/2010 | Okamoto et al. |
| 2011/0111308 A1 | 5/2011 | Halalay et al. |
| 2011/0281173 A1 | 11/2011 | Singh |
| 2011/0311881 A1 | 12/2011 | Benicewicz |
| 2012/0082903 A1 | 4/2012 | Zhang et al. |
| 2012/0141878 A1 | 6/2012 | Ohashi et al. |
| 2012/0214043 A1 | 8/2012 | Olschimke et al. |
| 2014/0060859 A1 | 3/2014 | Kountz et al. |
| 2014/0065461 A1 | 3/2014 | Kountz et al. |
| 2014/0245760 A1 | 9/2014 | Leck et al. |
| 2015/0093654 A1 | 4/2015 | Galiano |
| 2016/0028114 A1* | 1/2016 | Pratt ............... H01M 2/1673 429/309 |
| 2016/0043435 A1 | 2/2016 | DeSimone et al. |
| 2016/0221926 A1 | 8/2016 | Teran et al. |
| 2016/0226102 A1 | 8/2016 | Teran et al. |
| 2016/0226103 A1 | 8/2016 | Teran et al. |

FOREIGN PATENT DOCUMENTS

| | | |
|---|---|---|
| CN | 101302612 | 11/2008 |
| CN | 102091505 | 6/2011 |
| EP | 1 221 733 | 7/2002 |
| EP | 1 221 733 B1 | 7/2002 |
| EP | 2322586 | 5/2011 |
| FR | 2989683 | 10/2013 |
| JP | H3057106 A2 | 3/1991 |
| JP | 2000327634 A | 11/2000 |
| JP | 2004272161 | 9/2004 |
| JP | 2010044958 | 2/2010 |
| JP | 2011162572 | 8/2011 |
| JP | 2013069531 | 4/2013 |
| JP | 2013258076 | 12/2013 |
| JP | 2014002956 | 1/2014 |
| WO | WO 95/15588 A | 6/1995 |
| WO | WO 9744842 | 11/1997 |
| WO | WO 9826024 | 6/1998 |
| WO | WO 0146746 | 6/2001 |
| WO | WO 2004042453 | 5/2004 |
| WO | WO 2004068196 | 8/2004 |
| WO | WO 2005/081646 A2 | 9/2005 |
| WO | WO 2006/081646 | 8/2006 |
| WO | WO 2007044967 | 4/2007 |
| WO | WO 2009096570 | 8/2009 |
| WO | WO 2010096404 | 8/2010 |
| WO | WO 2010151639 | 12/2010 |
| WO | WO 2011/051275 | 5/2011 |
| WO | WO 2011066830 | 6/2011 |
| WO | WO 2014025317 | 2/2014 |
| WO | WO 2014-036360 | 3/2014 |
| WO | WO 2014-062898 | 4/2014 |
| WO | WO 2014204547 | 12/2014 |

OTHER PUBLICATIONS

Kasai et al. "Degradation perfluoropolyethers catalyzed by aluminum oxide", *Applied Surface Science*, vol. 51, Issues 3-4, 201-211 (1991).

Pacansky et al. "Electron Beam Irradiation of Polyperfluoroethers: Experimental Analysis of Main-Chain Degradation", *Chem Mater.*, 5, 486-494 (1993).

Paciorek et al. "Stability of perfluoroalkylethers", *Journal of Fluorine Chemistry*, vol. 67 Issue 2, 169-175 (1994).

Proudmore et al. Preparation and Properties of Polyurethane Networks Based on α,ω-Difunctional Poly(hexafluoropropylene oxide), *Journal of Polymer Science: Part A: Polymer Chemistry*, 33, 1615-1625 (1995|.

Howell et al. "The preparation of primary poly-hexafluoropropylene oxide halides (poly-HFPO-$CF_2$X where X=I, Br, Cl and F)", *Journal of Fluorine Chemistry*, vol. 125 Issue 10, 1513-1518 (2004).

(56) References Cited

OTHER PUBLICATIONS

Armand et al. "Building Better Batteries", *Nature*, 451:7;652-657 (2008).
Kim et al. "Electrode Materials for Rechargeable Sodium-Ion Batteries: Potential Alternatives to Current Lithium-Ion Batteries", *Adv. Energy Mater.*, vol. 2, 710-721 (2012).
International Search Report and Written Opinion, PCT/US2014/032363, mailed Jan. 12, 2015, 12 pages.
Smart et al. "Improved performance of lithium-ion cells with the use of fluorinated carbonate-based electrolytes" Journal of Power Sources, 119-121, pp. 359-367, 2003.
Bongiovanni et al. "Acrylic Polyester Resins Containing Perfluoropolyethers Structures: Synthesis, Characterization, and Photopolymerization" Journal of Applied Polymer Science 2000; 75: 651-659.
Bongiovanni et al. "Perfluoropolyether polymers by UV curing: design, synthesis and characterization" Polym Int 2012; 61: 65-73.
Chi-Chang Chen et al. "Solid Polymer Electrolytes III: Preparation, Characterization, and Ionic Conductivity of New Gelled Polymer Electrolytes Based on Segmented, Perfluoropolyether-Modified Polyurethane", J. Polymer Sci, A: Polymer Chemistry, vol. 40, 2002, pp. 486-495.
European Search Report Corresponding to European Patent Application No. 13 847 827.6; Dated: May 19, 2016; 7 Pages.
Eweka et al. Electrolytes and additives for high efficiency lithium cycling, *Journal of Power Sources* vol. 65, Issues 1-2, pp. 247-251 (1997) (Abstract Only).
Hu et al. "Photochemically Cross-Linked Perfluoropolyether-Based Elastomer: Synthesis, Physical Characterization, and Biofouling Evaluation" Macromolecules 2009; 42: 6999-7007.
International Search Report and Written Opinion, PCT/US2013/065396, mailed Jan. 6, 2014.
Jung-Ohk Kweon et al. "Perfluoropolyether Addition Effect on the Properties of Poly(Ethylene Oxide)-Based Solid Polymer Electrolytes", Korean Chem Eng Res, vol. 42, No. 6, Dec. 2004, pp. 741-747.
Kweon et al. "Perfluoropolyether Addition Effect on the Properties of Poly (Ethylene Oxide)-Based Solid Polymer Electrolytes" Korean Chemical Engineering Research 2004; 42(6): 741-747.
Nair et al. "Methacrylic-based solid polymer electrolyte membranes for lithium-based batteries by a rapid UV-curing process", *Reactive and Functional Polymers*, vol. 71, Issue 4, pp. 409-416 (2011) (Abstract Only).
Pilati et al. "Poly (ε-caprolactone)-Poly (fluoroalkylene oxide)-Poly (ε-caprolactone) Block Copolymers. 1. Synthesis and Molecular Characterization" Macromolecules 1999; 32: 6969-6976.
Rolland et al. "Solvent-Resistant Photocurable "Liquid Teflon" for Microfluidic Device Fabrication", *J. Am. Chem. Soc* 126:2322-2323 (2004).
Devaux, et al., "Characterizations of nonflammable perfluoropolyether based electrolytes and lithium battery application," (Abstract Only), Conference; Meeting Abstract, 248th ACS National Meeting & Exposition, Aug. 10-14, 2014 (2014), PMSE-541.
Tonelli, Claudio, et al., "Linear perfluoropolyether difunctional oligomers: chemistry, properties and applications," Journal of Fluorine Chemistry, Jun. 1999, 95(1), pp. 51-70.
Wong et al. "Nonflammable perfluoropolyether-based electrolytes for lithium Batteries" PNAS, 111(9), pp. 3327-3331, Mar. 4, 2014.
Office Action issued in U.S. Appl. No. 15/012,444, dated Jun. 22, 2016.
Final Office Action issued in U.S. Appl. No. 15/012,444, dated Oct. 12, 2016.
Notice of Allowance issued in U.S. Appl. No. 15/012,444, dated Nov. 2, 2016.
Office Action issued in U.S. Appl. No. 15/012,548, dated Jul. 25, 2016.
Notice of Allowance issued in U.S. Appl. No. 15/012,548, dated Nov. 21, 2016.
International Search Report and Written Opinion dated Apr. 11, 2016 issued in PCT Application No. PCT/US16/16221.
International Search Report and Written Opinion dated Apr. 11, 2016 in PCT/US2016/16188.

\* cited by examiner

Figure 1. Maximum lithium salt concentration as a function of PFPE molecular weight.

Figure 2. Maximum concentration of lithium cations per concentration of polymer end group as a function of PFPE molecular weight.

Figure 3. Conductivity, σ, as a function of temperature.

Figure 4. Conductivity, σ, as a function of lithium salt concentration, r, at 25°C.

Figure 5. Conductivity, σ, as a function of lithium salt concentration, r, at 60°C.

Figure 6. Conductivity, σ, as a function of temperature.

Figure 7. Conductivity, σ, as a function of lithium salt concentration.

Figure 8. Conductivity, σ, as a function of lithium salt concentration.

ION CONDUCTING FLUOROPOLYMER CARBONATES FOR ALKALI METAL ION BATTERIES

RELATED APPLICATIONS

This application is a 35 U.S.C. §371 national phase entry of PCT Application PCT/US2014/032363, filed Mar. 31, 2014, and published in English on Dec. 24, 2014, as International Publication No. WO 2014/204547, and which claims the benefit of U.S. Provisional Patent Application Ser. No. 61/807,084, filed Apr. 1, 2013, and U.S. Provisional Patent Application Ser. No. 61/812,002, filed Apr. 15, 2013, the disclosure of each of which is incorporated herein by reference in its entirety.

GOVERNMENT SUPPORT

This invention was made with government support under Grant No. DE-SC0001011, Grant No. DE-EE0003188 and Contract No. DE-AC02-05CH11231 awarded by the Department of Energy, Grant No, DMR-1122483 awarded by the National Science Foundation and Grant No. N00014-10-10550 awarded by the Office of Naval Research. The US Government has certain rights to this invention.

FIELD OF THE INVENTION

The present invention concerns liquid and solid polymer electrolyte compositions for use in batteries such as lithium-ion batteries, lithium-air batteries, and sodium-air batteries.

BACKGROUND OF THE INVENTION

One of the biggest challenges faced by modern society is to secure sustainable resources that meet burgeoning energy demands (R. Marom et al., *Journal of Materials Chemistry* 21, 9938 (2011)). One area of great interest is developing lithium (Li) batteries suitable for large-scale applications, such as transportation and energy storage (J. Tarascon and M. Armand, *Nature* 414, 359 (November, 2001)). Currently, Li-ion batteries are used in electric vehicles (EVs), but factors including cost and longevity limit their prevalence (O. Egbue and S. Long, *Energy Policy* 48, 717 (2012)). Safety is also a primary concern; most commercial Li-ion batteries consist of a flammable mixture of volatile alkyl carbonates (e.g., ethylene carbonate, dimethyl carbonate, propylene carbonate, diethyl carbonate, etc.) that serves as the electrolyte solvent. See, e.g., S. Harris et al., *A combustion chemistry analysis of carbonate solvents used in Li-ion batteries*, Journal of Power Sources 193, 855-858 (2009).

In the last decade, there has been extensive efforts to introduce alternative solvents, salts, and additives that can improve the quality and performance of electrolytes (D. Aurbach et al., *Electrochimica Acta* 50, 247 (2004)). The preparation of polyelectrolytes is an emerging area of interest due to their potential lower costs, easy handling, and better safety. Poly(ethylene oxide) (PEO) is the most prominently featured homopolymer in this field due its unique ability to solvate Li-based salts. The crystallinity of PEO, however, hinders ionic conductivity, rendering PEO-LiX electrolytes useful at temperatures between 60° to 80° C. (F. Croce et al., *Nature* 394, 456 (1998)). Dendrite formation at the anode electrode remains a persistent issue, causing shortcircuits and overcharging, which can lead to cell ignition or explosion (S. Tobishima et al., *Journal of Power Sources* 90, 188 (2000); H. Ghassemi et al., *Applied Physics Letters* 99, 123113 (2011)). Accordingly, there is a need for new electrolyte compositions for lithium ion batteries, and other types of alkali metal ion batteries.

SUMMARY OF THE INVENTION

Liquid and solid polymer electrolyte compositions useful in alkali metal ion batteries, are described herein, along with alkali metal ion batteries (including lithium and sodium ion and air batteries) containing the same. In some embodiments, the compositions are advantageously characterized by, one, some or all of: low flammability/high flame resistance; low glass transition temperature, flexibility, high ionic conductivity, and/or a broad electrochemical stability window.

A first object of the present invention is, accordingly, a liquid or solid electrolyte composition (e.g., for a capacitor or for a battery such as an alkali metal ion battery), comprising: (a) a homogeneous solvent system, said solvent system comprising a fluoropolymer, said fluoropolymer having one or two terminal carbonate groups covalently coupled thereto; and (b) an alkali metal salt dissolved in said solvent system.

In some embodiments the alkali metal salt is a lithium salt; in other embodiments the alkali metal salt is a sodium or potassium salt.

Other ingredients, such as standard contaminants found in battery-grade reagents, initiators, and/or electrode stabilizing agents, may optionally be included.

In some embodiments, the composition is free or substantially free of volatile (that is, flammable) organic carbonate solvent (e.g., contains less than five, two, or one percent by weight of volatile organic carbonate solvent, such as C1 to C5 or C10 alkyl carbonates).

In some embodiments, the composition has a $T_g$ between $-120$, $-115$ or $-90°$ C. and $-40$ or $-20°$ C.

In some embodiments, the electrolyte compositions do not ignite when heated to a temperature of 235° C. and then contacted to a flame for 15 seconds in a Kohler open cup rapid flash test apparatus.

In some embodiments, the electrolyte compositions have an ionic conductivity of from $10^{-9}$ $10^{-4}$ or $10^{-3}$ to $10^1$ or $10^2$ siemens per centimeter at 25° C.

In some embodiments, the electrolyte compositions have an electrochemical stability window of from 1 or 3 to 6 volts against $Li/Li^+$.

The present invention is explained in greater detail in the specification set forth below. The disclosure of all United States patent references cited herein are to be incorporated herein by reference in their entirety.

DETAILED DESCRIPTION OF ILLUSTRATIVE EMBODIMENTS

"Alkyl" as used herein alone or as part of another group, refers to a straight or branched chain hydrocarbon containing from 1 to 10, 20, or 30 or more carbon atoms. Representative examples of alkyl include, but are not limited to, methyl, ethyl, n-propyl, iso-propyl, n-butyl, sec-butyl, iso-butyl, tert-butyl, n-pentyl, isopentyl, neopentyl, n-hexyl, 3-methylhexyl, 2,2-dimethylpentyl, 2,3-dimethylpentyl, n-heptyl, n-octyl, n-nonyl, n-decyl, and the like. "Lower alkyl" as used herein, is a subset of alkyl, in some embodiments preferred, and refers to a straight or branched chain hydrocarbon group containing from 1 to 4 carbon atoms. Representative examples of lower alkyl include, but are not limited to, methyl, ethyl, n-propyl, iso-propyl, n-butyl, iso-butyl, tert-butyl, and the like. The term "akyl" or "loweralkyl" is intended to include both substituted and unsubstituted alkyl or loweralkyl unless otherwise indicated and these groups may be substituted with additional organic and/or inorganic groups, including but not limited to groups selected from halo (e.g., to form haloalkyl), alkyl, haloalkyl, alkenyl, alkynyl, cycloalkyl, cycloalkylalkyl, aryl, arylalkyl, heterocyclo, heterocycloalkyl, hydroxyl, alkoxy (thereby creating a polyalkoxy such as polyethylene glycol), fluoropolymer (including perfluoropolymers, fluoropolyethers, and perfluoropolyethers), alkenyloxy, alkynyloxy, haloalkoxy, cycloalkoxy, cycloalkylalkyloxy, aryloxy, arylalkyloxy, heterocyclooxy, heterocyclolalkyloxy, mercapto, alkyl-S(O)$_m$, haloalkyl-S(O)$_m$, alkenyl-S(O)$_m$, alkynyl-S(O)$_m$, cycloalkyl-S(O)$_m$, cycloalkylalkyl-S(O)$_m$, aryl-S(O)$_m$, arylalkyl-S(O)$_m$, heterocyclo-S(O)$_m$, heterocycloalkyl-S(O)$_m$, amino, carboxy, alkylamino, alkenylamino, alkynylamino, haloalkylamino, cycloalkylamino, cycloalkylalkylamino, arylamino, arylalkylamino, heterocycloamino, heterocycloalkylamino, disubstituted-amino, acylamino, acyloxy, ester, amide, sulfonamide, urea, alkoxyacylamino, aminoacyloxy, nitro or cyano where m=0, 1, 2 or 3.

"Alkenyl" as used herein alone or as part of another group, refers to a straight or branched chain hydrocarbon containing from 1 to 10, 20, or 30 or more carbon atoms (or in loweralkenyl 1 to 4 carbon atoms) which include 1 to 4, 5 or 6 or more double bonds in the normal chain. Representative examples of alkenyl include, but are not limited to, vinyl, 2-propenyl, 3-butenyl, 2-butenyl, 4-pentenyl, 3-pentenyl, 2-hexenyl, 3-hexenyl, 2,4-heptadiene, and the like. The term "alkenyl" or "loweralkenyl" is intended to include both substituted and unsubstituted alkenyl or loweralkenyl unless otherwise indicated and these groups may be substituted with groups as described in connection with alkyl and loweralkyl above.

"Alkynyl" as used herein alone or as part of another group, refers to a straight or branched chain hydrocarbon containing from 1 to 10, 20, 30 or 40 or more carbon atoms (or in loweralkynyl 1 to 4 carbon atoms) which include 1, 2, or 3 or more triple bonds in the normal chain. Representative examples of alkynyl include, but are not limited to, 2-propynyl, 3-butynyl, 2-butynyl, 4-pentynyl, 3-pentynyl, and the like. The term "alkynyl" or "loweralkynyl" is intended to include both substituted and unsubstituted alkynyl or loweralknynyl unless otherwise indicated and these groups may be substituted with the same groups as set forth in connection with alkyl and loweralkyl above.

"Aryl" as used herein alone or as part of another group, refers to a monocyclic carbocyclic ring system or a bicyclic carbocyclic fused ring system having one or more aromatic rings. Representative examples of aryl include, azulenyl, indanyl, indenyl, naphthyl, phenyl, tetrahydronaphthyl, and the like. The term "aryl" is intended to include both substituted and unsubstituted aryl unless otherwise indicated and these groups may be substituted with the same groups as set forth in connection with alkyl and loweralkyl above.

"Cycloalkyl" as used herein alone or as part of another group, refers to a saturated or partially unsaturated cyclic hydrocarbon group containing from 3, 4 or 5 to 6, 7 or 8 carbons (which carbons may be replaced in a heterocyclic group as discussed below). Representative examples of cycloalkyl include, cyclopropyl, cyclobutyl, cyclopentyl, cyclohexyl, cycloheptyl, and cyclooctyl. These rings may be optionally substituted with additional substituents as described herein such as halo or loweralkyl. The term "cycloalkyl" is generic and intended to include heterocyclic groups as discussed below unless specified otherwise.

"Heterocyclo" as used herein alone or as part of another group, refers to an aliphatic (e.g., fully or partially saturated heterocyclo) or aromatic (e.g., heteroaryl) monocyclic- or a bicyclic-ring system. Monocyclic ring systems are exemplified by any 5 or 6 membered ring containing 1, 2, 3, or 4 heteroatoms independently selected from oxygen, nitrogen and sulfur. The 5 membered ring has from 0-2 double bonds and the 6 membered ring has from 0-3 double bonds. Representative examples of monocyclic ring systems include, but are not limited to, azetidine, azepine, aziridine, diazepine, 1,3-dioxolane, dioxane, dithiane, furan, imidazole, imidazoline, imidazolidine, isothiazole, isothiazoline, isothiazolidine, isoxazole, isoxazoline, isoxazolidine, morpholine, oxadiazole, oxadiazoline, oxadiazolidine, oxazole, oxazoline, oxazolidine, piperazine, piperidine, pyran, pyrazine, pyrazole, pyrazoline, pyrazolidine, pyridine, pyrimidine, pyridazine, pyrrole, pyrroline, pyrrolidine, tetrahydrofuran, tetrahydrothiophene, tetrazine, tetrazole, thiadiazole, thiadiazoline, thiadiazolidine, thiazole, thiazoline, thiazolidine, thiophene, thiomorpholine, thiomorpholine sulfone, thiopyran, triazine, triazole, trithiane, and the like. Bicyclic ring systems are exemplified by any of the above monocyclic ring systems fused to an aryl group as defined herein, a cycloalkyl group as defined herein, or another monocyclic ring system as defined herein. Representative examples of bicyclic ring systems include but are not limited to, for example, benzimidazole, benzothiazole, benzothiadiazole, benzothiophene, benzoxadiazole, benzoxazole, benzofuran, benzopyran, benzothiopyran, benzodioxine, 1,3-benzodioxole, cinnoline, indazole, indole, indoline, indolizine, naphthyridine, isobenzofuran, isobenzothiophene, isoindole, isoindoline, isoquinoline, phthalazine, purine, pyranopyridine, quinoline, quinolizine, quinoxaline, quinazoline, tetrahydroisoquinoline, tetrahydroquinoline, thiopyranopyridine, and the like. These rings include quaternized derivatives thereof and may be optionally substituted with additional organic and/or inorganic groups, including but not limited to groups selected from halo, alkyl, haloalkyl, alkenyl, alkynyl, cycloalkyl, cycloalkylalkyl, aryl, arylalkyl, heterocyclo, heterocycloalkyl, hydroxyl, alkoxy, fluoropolymer (including perfluoropolymers, fluoropolyethers, and perfluoropolyethers), alkenyloxy, alkynyloxy, haloalkoxy, cycloalkoxy, cycloalkylalkyloxy, aryloxy, arylalkyloxy, heterocyclooxy, heterocyclolalkyloxy, mercapto, alkyl-S(O)$_m$, haloalkyl-S(O)$_m$, alkenyl-S(O)$_m$, alkynyl-S(O)$_m$, cycloalkyl-S(O)$_m$, cycloalkylalkyl-S(O)$_m$, aryl-S(O)$_m$, arylalkyl-S(O)$_m$, heterocyclo-S(O)$_m$, heterocycloalkyl-S(O)$_m$, amino, alkylamino, alkenylamino, alkynylamino, haloalkylamino, cycloalkylamino, cycloalkylalkylamino, arylamino, arylalkylamino, heterocycloamino, heterocycloalkylamino, disubstituted-amino, acylamino, acyloxy, ester, amide, sulfonamide, urea, alkoxyacylamino, aminoacyloxy, nitro or cyano where m=0, 1, 2 or 3.

"Heteroaryl" as used herein is as described in connection with heterocyclo above.

"Cycloalkylalkyl," "cycloalkylalkenyl," and "cycloalkylalkynyl" as used herein alone or as part of another group, refers to a cycloalkyl group, as defined herein, appended to the parent molecular moiety through an alkyl, alkenyl, or alkynyl group, as defined herein. Representative examples of arylalkyl include, but are not limited to, benzyl, 2-phenylethyl, 3-phenylpropyl, 2-naphth-2-ylethyl, and the like.

"Arylalkyl," "Arylalkenyl," and "Arylalkynyl" as used herein alone or as part of another group, refers to an aryl group, as defined herein, appended to the parent molecular moiety through an alkyl, alkenyl, or alkynyl group, as defined herein. Representative examples of arylalkyl include, but are not limited to, benzyl, 2-phenylethyl, 3-phenylpropyl, 2-naphth-2-ylethyl, and the like.

"Heterocycloalkyl," "heterocycloalkenyl," and "heterocycloalkynyl" as used herein alone or as part of another group, refers to a heterocyclo group, as defined herein, appended to the parent molecular moiety through an alkyl, alkenyl, or alkynyl group, as defined herein. Representative examples of arylalkyl include, but are not limited to, benzyl, 2-phenylethyl, 3-phenylpropyl, 2-naphth-2-ylethyl, and the like.

"Alkoxy" as used herein alone or as part of another group, refers to an alkyl or loweralkyl group, as defined herein (and thus including substituted versions such as polyalkoxy), appended to the parent molecular moiety through an oxy group, —O—. Representative examples of alkoxy include, but are not limited to, methoxy, ethoxy, propoxy, 2-propoxy, butoxy, tert-butoxy, pentyloxy, hexyloxy and the like.

"Halo" as used herein refers to any suitable halogen, including —F, —Cl, —Br, and —I.

"Mercapto" as used herein refers to an —SH group.

"Azido" as used herein refers to an —N$_3$ group.

"Cyano" as used herein refers to a —CN group.

"Formyl" as used herein refers to a —C(O)H group.

"Carboxylic acid" as used herein refers to a —C(O)OH group.

"Hydroxyl" as used herein refers to an —OH group.

"Nitro" as used herein refers to an —NO$_2$ group.

"Acyl" as used herein alone or as part of another group refers to a —C(O)R radical, where R is any suitable substituent such as aryl, alkyl, alkenyl, alkynyl, cycloalkyl or other suitable substituent as described herein.

"Alkylthio" as used herein alone or as part of another group, refers to an alkyl group, as defined herein, appended to the parent molecular moiety through a thio moiety, as defined herein. Representative examples of alkylthio include, but are not limited, methylthio, ethylthio, tert-butylthio, hexylthio, and the like.

"Amino" as used herein means the radical —NH$_2$.

"Alkylamino" as used herein alone or as part of another group means the radical —NHR, where R is an alkyl group.

"Arylalkylamino" as used herein alone or as part of another group means the radical —NHR, where R is an arylalkyl group.

"Disubstituted-amino" as used herein alone or as part of another group means the radical —NR$_a$R$_b$, where R$_a$ and R$_b$ are independently selected from the groups alkyl, haloalkyl, alkenyl, alkynyl, cycloalkyl, cycloalkylalkyl, aryl, arylalkyl, heterocyclo, heterocycloalkyl.

"Acylamino" as used herein alone or as part of another group means the radical —NR$_a$R$_b$, where R$_a$ is an acyl group as defined herein and R$_b$ is selected from the groups hydrogen, alkyl, haloalkyl, alkenyl, alkynyl, cycloalkyl, cycloalkylalkyl, aryl, arylalkyl, heterocyclo, heterocycloalkyl.

"Acyloxy" as used herein alone or as part of another group means the radical —OR, where R is an acyl group as defined herein.

"Ester" as used herein alone or as part of another group refers to a —C(O)OR radical, where R is any suitable substituent such as alkyl, cycloalkyl, alkenyl, alkynyl or aryl.

"Amide" as used herein alone or as part of another group refers to a —C(O)NR$_a$R$_b$ radical, where R$_a$ and R$_b$ are any suitable substituent such as alkyl, cycloalkyl, alkenyl, alkynyl or aryl.

"Sulfoxyl" as used herein refers to a compound of the formula —S(O)R, where R is any suitable substituent such as alkyl, cycloalkyl, alkenyl, alkynyl or aryl.

"Sulfonyl" as used herein refers to a compound of the formula —S(O)(O)R, where R is any suitable substituent such as alkyl, cycloalkyl, alkenyl, alkynyl or aryl.

"Sulfonate" as used herein refers to a compound of the formula —S(O)(O)OR, where R is any suitable substituent such as alkyl, cycloalkyl, alkenyl, alkynyl or aryl.

"Sulfonic acid" as used herein refers to a compound of the formula —S(O)(O)OH.

"Sulfonamide" as used herein alone or as part of another group refers to a —S(O)$_2$NR$_a$R$_b$ radical, where R$_a$ and R$_b$ are any suitable substituent such as H, alkyl, cycloalkyl, alkenyl, alkynyl or aryl.

"Urea" as used herein alone or as part of another group refers to an N(R$_c$)C(O)NR$_a$R$_b$ radical, where R$_a$, R$_b$ and R$_c$ are any suitable substituent such as H, alkyl, cycloalkyl, alkenyl, alkynyl or aryl.

"Alkoxyacylamino" as used herein alone or as part of another group refers to an —N(R$_a$)C(O)OR$_b$ radical, where R$_a$, R$_b$ are any suitable substituent such as H, alkyl, cycloalkyl, alkenyl, alkynyl or aryl.

"Aminoacyloxy" as used herein alone or as part of another group refers to an —OC(O)NR$_a$R$_b$ radical, where R$_a$ and R$_b$ are any suitable substituent such as H, alkyl, cycloalkyl, alkenyl, alkynyl or aryl.

"Fluoropolymers" and "perfluoropolymers" are known. Examples include but are not limited to fluoropolyethers and perfluoropolyethers, poly(perfluoroalkyl acrylate), poly(perfluoroalkyl methacrylate), polytetrafluoroethylene, polychlorotrifluoroethylene, polyvinylidene fluoride, etc. See, e.g., U.S. Pat. Nos. 8,361,620; 8,158,728 (DeSimone et al.); and U.S. Pat. No. 7,989,566.

Perfluoropolyethers are known. Examples include but are not limited to polymers that include a segment such as a difluoromethylene oxide, tetrafluoroethylene oxide, hexafluoropropylene oxide, tetrafluoroethylene oxide-co-difluoromethylene oxide, hexafluoropropylene oxide-co-difluoromethylene oxide, or a tetrafluoroethylene oxide-co-hexafluoropropylene oxide-co-difluoromethylene oxide segments and combinations thereof. See, e.g., U.S. Pat. No. 8,337,986. Additional examples include but are not limited to those described in P. Kasai et al., *Applied Surface Science* 51, 201-211 (1991); J. Pacansky and R. Waltman, *Chem. Mater.* 5, 486-494 (1993); K. Paciorek and R. Kratzer, *Journal of Fluorine Chemistry* 67, 169-175 (1994); M. Proudmore et al., *Journal of Polymer Science: Part A: Polymer Chemistry*, 33, 1615-1625 (1995); J. Howell et al., *Journal of Fluorine Chemistry* 125, 1513-1518 (2004); and in U.S. Pat. Nos. 8,084,405; 7,294,731; 6,608,138; 5,612,043; 4,745,009; 4,178,465; etc.

A. Fluoropolymer Carbonates.

Suitable fluoropolymer carbonates for use in the present invention include compounds of Formula I, Formula II, and mixtures thereof (e.g., including two or more different compounds both of general Formula I, one or more compound of general formula I and one or more compound of general Formula II, two or more different compounds of general Formula II):

wherein:

$R_f$ is a fluoropolymer having a weight average molecular weight of from 0.2, 0.4 or 0.5 to 5, 10 or 20 Kg/mol; and R' and R" are each independently selected aliphatic, aromatic, or mixed aliphatic and aromatic groups (e.g., are each independently selected from the group consisting of alkyl, alkenyl, alkynyl, cycloalkylalkyl, cycloalkylalkenyl, cycloalkylalkynyl, arylalkyl, arylalkenyl, arylalkynyl, heterocycloalkyl, heterocycloalkenyl, heterocycloalkynyl, etc., including fluoropolymers as given in connection with $R_f$, polyethers such as polyethylene glycol (PEG), polyether carbonates such as PEG carbonate, etc.).

Such fluoropolymer carbonates can be prepared by techniques such as described in J. Holbrey et al., *Optimised microwave-assisted synthesis of methylcarbonate salts: a convenient methodology to prepare intermediates for ionic liquid libraries*, Green Chemistry 12, 407-413 (2010) and C. Chiappe and S. Rajamani, *Synthesis of glycerol carbonate from glycerol and dimethyl carbonate in basic ionic liquids*, Pure Appl. Chem. 84, 755-762 (2012), or variations thereof that will be apparent to those skilled in the art based upon the present disclosure.

Particular examples of compounds of Formula I above include but are not limited to compounds of Formula III:

where:

n and m when present are each independently selected integers that together correspond to a molecular weight for fluoropolymer of said compound as given above, and

R' and R" are each independently selected substituents as given above, such as methyl, ethyl, propyl, isopropyl, butyl, isobutyl, n-pentyl, phenyl, tolyl, naphthyl, benzyl, etc, including polyethers, polyether carbonates, and those groups given in connection with $R_f$ above.

In addition to the forgoing, compounds of Formulas I and/or II can be combined with non-polymeric fluorocarbon carbonates to produce homogeneous solvent systems of the invention. Examples of such fluorocarbon carbonates include but are not limited to compounds of Formula IV:

wherein R' is as given in connection with Formulas I-II above. Compounds of Formula IV can be produced by techniques such as those described in M. Smart et al., US Patent Application Publication No. US2010047695.

Fluoro carbonate compounds (fluoropolymer carbonates; fluorocarbon carbonates) as described above can be blended with other compounds, such as polyethers and polyether carbonates (e.g., polyethylene glycol carbonates), examples of to produce the electrolyte compositions described herein. Examples of such other compounds include but are not limited to compounds of Formula V and Formula VI:

wherein:

n is an integer of from 1 to 5; and

R' and R" are as given in connection with Formulas I-II above.

Compounds of Formulas V-VI can be made by any suitable technique, including but not limited to those described in PCT Application WO9621639 (Mitsui Chemicals; same as EP0823744) and L. Gireaud, et al., *Anal. Chem.* 78, 3688-3698 (2006).

Polyethers and polyether carbonates such as compounds of Formulas V-VI can be included in any suitable amount, for example as about 5 to 30 percent by weight of the electrolyte composition, since they are substantially less volatile than conventional, volatile, carbonate solvents. In some embodiments this serves to extend low temperature use of the compositions while reducing low temperature crystallization therein.

B. Electrolyte Compositions.

Electrolyte compositions of the present invention can be prepared by any suitable technique, such as mixing a fluoropolymer carbonate as described above after polymerization thereof with an alkali metal ion salt, and optionally other ingredients, as described below, in accordance with known techniques. In the alternative, electrolyte compositions can be prepared by including some or all of the composition ingredients in combination with the reactants for the preparation of the fluoropolymer carbonate prior to reacting the same.

When other ingredients are included in the homogeneous solvent system, in general, the fluoropolymer carbonate is included in the solvent system in a weight ratio to all other ingredients (e.g., polyether, polyether carbonates) of from 50:50, 60:40, or 70:30, up to 90:10, 95:5, or 99:1, or more.

Alkali metal ion salts that can be used to carry out the present invention are also known or will be apparent to those skilled in the art. Any suitable salt can be used, including both lithium salts and sodium salts, and potassium salts: That is, salts containing lithium or sodium or potassium as a cation, and an anion. Any suitable anion may be used, examples of which include, but are not limited to, boron tetrafluoride, aluminate, (oxalate)borate, difluoro(oxalate) borate, phosphorus hexafluoride, alkylsulfonate, fluoroalkylsulfonate, arylsulfonate, bis(alkylsulfonyl)amide, perchlorate, bis(fluoroalkylsulfonyl)amide, bis(arylsulfonyl)amide, alkyl fluorophosphate, (fluoroalkylsulfonyl)(fluoroalkylcarbonyl)amide, halide, nitrate, nitrite, sulfate, hydrogen sulfate, alkyl sulfate, aryl sulfate, carbonate, bicarbonate, carboxylate, phosphate, hydrogen phosphate, dihydrogen phosphate, hypochlorite, an anionic site of a cation-exchange resin, and a mixture of any two or more thereof. See, e.g., Zhang et al., US Patent Application Publication No. 2012/0082903.

The alkali metal salt may be included in the liquid or solid compositions in any suitable amount, typically from about 5 or 10 percent by weight, up to 20 or 30 percent by weight. Likewise, the solvent system or crosslinked polymer may be included in the composition in any suitable amount, typically from 70 or 75 percent by weight up to 85, 90 or 95 percent by weight.

The PFPE and PEO may be included in the solvent system in any suitable amount, such in a weight ratio (PFPE:PEO) range of between (on one end of the range) 40:60, 50:50, or 60:40, up to (on the other end of the range) 80:20, 90:10 or 95:5.

If desired, an electrode stabilizing agent can be added to or included in the electrolyte compositions (in some embodiments before cross-linking thereof), in accordance with known techniques. See, e.g., Zhang et al., US Pat. App. Pub No. 2012/0082903. For example, the electrolytes can include an electrode stabilizing additive that can be reduced or polymerized on the surface of a negative electrode to form a passivation film on the surface of the negative electrode. Likewise, the electrolytes can include an electrode stabilizing additive that can be oxidized or polymerized on the surface of the positive electrode to form a passivation film on the surface of the positive electrode. In some embodiments, electrolytes can include mixtures of the two types of electrode stabilizing additives. The additives are typically present at a concentration of about 0.001 to 8 wt %. For example, an electrode stabilizing additive can be a substituted or unsubstituted linear, branched or cyclic hydrocarbon comprising at least one oxygen atom and at least one aryl, alkenyl or alkynyl group. The passivating film formed from such electrode stabilizing additives may also be formed from a substituted aryl compound or a substituted or unsubstituted heteroaryl compound where the additive comprises at least one oxygen atom. Numerous particular examples are described in Zhang et al. at paragraphs 173-174 therein.

If desired, fillers or conductivity enhances may optionally be included in the electrolyte compositions. Examples include but are not limited to include but are not limited to $Al_2O_3$, AlOOH, $BaTiO_3$, BN, $LiN_3$ $LiAlO_2$, lithium fluorohectorite, and/or fluoromica clay. Finally, additives such as hexamethyldisilazane (HMDS) may also be included to improve interfacial resistance in a lithium cell and trap (react) with any available water and that may be present and detrimental to cell performance. See, US Patent App. Pub. No. 2011/0311881 at paragraphs 87-88.

C. Alkali Metal Batteries.

An alkali metal battery (sometimes also referred to as alkali metal ion batteries, and including alkali metal-air batteries) of the present invention generally includes (a) an anode; (b) a cathode; (c) a liquid or solid electrolyte composition as described above operatively associated with the anode and cathode, and (d) optionally a separator for physically separating the anode and cathode (See, e.g., M. Armand and J.-M. Tarascon, Building Bettery Batteries, *Nature* 451, 652-657 (2008)). Examples of suitable battery components include but are not limited to those described in U.S. Pat. Nos. 5,721,070; 6,413,676; 7,729,949; and 7,732, 100, and in US Patent Application Publication Nos. 2009/0023038; 2011/0311881; and 2012/0082930; and S.-W. Kim et al., *Adv. Energy Mater.* 2, 710-721 (2012).

Examples of suitable anodes include but are not limited to anodes formed of lithium metal, lithium alloys, sodium metal, sodium alloys, carbonaceous materials such as graphite, and combinations thereof. Examples of suitable cathodes include, but are not limited to cathodes formed of transition metal oxides, doped transition metal oxides, metal phosphates, metal sulfides, lithium iron phosphate, and combinations thereof. See, e.g., U.S. Pat. No. 7,722,994. Additional examples include but are not limited to those described in Zhang et al., US Pat. App. Pub No. 2012/0082903, at paragraphs 178 to 179. In some embodiments, an electrode such as a cathode can be a liquid electrode, such as described in Y. Lu et al., *J. Am. Chem. Soc.* 133, 5756-5759 (2011). Numerous carbon electrode materials, including but not limited to carbon foams, fibers, flakes, nanotubes and other nanomaterials, etc., alone or as composites with each other or other materials, are known and described in, for example, U.S. Pat. Nos. 4,791,037; 5,698, 341; 5,723,232; 5,776,610; 5,879,836; 6,066,413; 6,146, 791; 6,503,660; 6,605,390; 7,071,406; 7,172,837; 7,465, 519; 7,993,780; 8,236,446, and 8,404,384. In an alkali metal-air battery such as a lithium-air battery, sodium-air battery, or potassium-air battery, the cathode is preferably permeable to oxygen (e.g., mesoporous carbon, porous aluminum, etc.), and the cathode may optionally contain a metal catalyst (e.g., manganese, cobalt, ruthenium, platinum, or silver catalysts, or combinations thereof) incorporated therein to enhance the reduction reactions occurring with lithium ion and oxygen at the cathode. See, e.g., U.S. Pat. No. 8,012,633 and US Patent Application Publication Nos. 2013/0029234; 2012/0295169; 2009/0239113; see also P. Hartmann et al., A rechargeable room-temperature sodium superoxide ($NaO_2$) battery, *Nature Materials* 12, 228-232 (2013).

Where the electrolyte composition is a liquid composition, a separator formed from any suitable material permeable to ionic flow can also be included to keep the anode and cathode from directly electrically contacting one another. Examples of suitable separators include, but are not limited to, porous membranes or films formed from organic polymers such as polypropylene, polyethylene, etc., including composites thereof. See generally P. Arora and Z. Zhang, Battery Separators, *Chem. Rev.* 104, 4419-4462 (2004). When the electrolyte composition is a solid composition, particularly in the form of a film, it can serve as its own separator. Such solid film electrolyte compositions of the present invention may be of any suitable thickness depending upon the particular battery design, such as from 0.01, 0.02, 0.1 or 0.2 microns thick, up to 25, 30, or 50 microns thick, or more.

All components of the battery can be included in or packaged in a suitable rigid or flexible container with external leads or contacts for establishing an electrical connection to the anode and cathode, in accordance with known techniques.

The present invention is explained in greater detail in the following non-limiting Examples.

Example 1

Synthesis of Carbonate-Terminated Perfluoropolyether (PFPE-DMC)

0.02 moles of PFPE and triethylamine were charged to a 250 mL round bottom flask. 150 mL of 1,1,1,3,3-pentafluorobutane was added and the flask was flushed with nitrogen and stirred at 0° C. for 30 minutes. 0.02 moles of methyl chloroformate was added to 10 mL of 1,1,1,3,3-pentafluorobutane and the solution was added dropwise to the reaction flask, which was then stirred at 25° C. for 12 hours. The mixture was subsequently filtered and washed with water and brine. Removal of 1,1,1,3,3-pentafluorobutane through rotary evaporation yielded the isolated PFPE-DMC product. This procedure can be repeated with Fluorolink D10 ($M_w$=1000), Fluorolink D10/H ($M_w$=1400), Fomblin ZDOL 2000 ($M_w$=2000), and Fomblin ZDOL 4000 ($M_w$=2000).

Example 2

Polymer Electrolyte Preparation

After being dried overnight in an argon-filled glove box, lithium salt was added directly to PFPE and stirred at room temperature for about 12 hours in a dry, inert atmosphere.

Example 3

Electrolyte Characterization

The electrolytes were characterized using a Bruker 400 MHz NMR instrument. Thermogravimetric analysis (TGA) was performed using a Perkin Elmer, Pyris 1 TGA apparatus. Scan was made under nitrogen atmosphere from 20° C. to 600° C. with a heating rate of 10° C./minute. Glass transition state ($T_g$), crystallization ($T_c$) and melting temperatures ($T_m$) were measured using a differential scanning calorimeter (DSC) (TA Instruments, DSC Q 200) in air using the method of heat/cool/heat at a heating and cooling rate of 10° C. and 5° C./minute respectively, over a temperature range of −150° C. to 100° C. The $T_g$ was determined using the midpoint method on the second heating cycle thermogram. The $T_c$ and $T_m$ were determined as the peak maximum and minimum of the cooling and heating cycle respectively. Sustained burning characteristics and flash point data were determined using a Rapid Flash Tester in accordance with ASTM D-4206 and ASTM D3278 respectively. Infrared spectroscopy was done using a Bruker ALPHA FT-IR instrument.

Example 4

Electrochemical Measurements

Conductivity measurements were obtained using a similar procedure to that previously reported by Teran et al. (*Solid State Ionics* 203, 18-21). Electrolytes were placed in homemade conductivity cells; sample thicknesses were determined by subtracting the thickness of the lower and upper electrodes from the overall assembled cell thickness. The thicknesses ranged from 1 to 2.5 mm. A home-made temperature controlled box was used to house the cells during the electrochemical experiments. The AC impedance spectroscopy measurements, performed using a 16-channel Bio-Logic VMP3 potentiostat, were made across the frequency range 1 MHz to 10 Hz at a peak-to-peak amplitude voltage of 20 mV. The electrolyte resistance, R, was determined by the low-frequency minimum on a Nyquist impedance plot. Measurements were made at a series of temperatures with a minimum of 2 h calibration at each temperature. All data presented in this work are from heating runs.

Example 5

Coin Cell Preparation

Slurries containing 85.0 wt. % LiNMC, 7.0 wt. % AB, and 8.0 wt. % PVDF dispersed in NMP solvent were prepared. LiNMC laminates were prepared by casting the slurries onto aluminum foil by the doctor blade method. The laminates were subsequently punched into 14.3 mm diameter discs and dried completely before electrochemical studies. Active material loading is, on average, 1.9 mg/cm². Coin cells were assembled in standard 2325 coin cell hardware. Lithium foil was used as anode material and LiNMC was used as active material in the cathode. Celgard 2500, punched into circles with a diameter of 20.6 mm, served as physical separators. The entire procedure was performed in an argon-filled glove box. Cell testing was conducted on a Maccor Battery Cycler connected with a Thermotron Environmental Chamber set at 30° C. The batteries were cycled between 2.8 and 4.3 V with equivalent charge and discharge rates. Four formation cycles were performed at C/20 before the cycling rates were increased to C/15, C/10 and C/8 respectively.

Example 6

Determination of Maximum Salt Concentration

Maximum salt concentration in PFPE electrolytes have been determined two ways: Inductively coupled plasma mass spectroscopy, and qualitatively in the glove box. To date, both ways have been used to determine the maximum concentration of LiTFSI that can be achieved.

Figure 1:
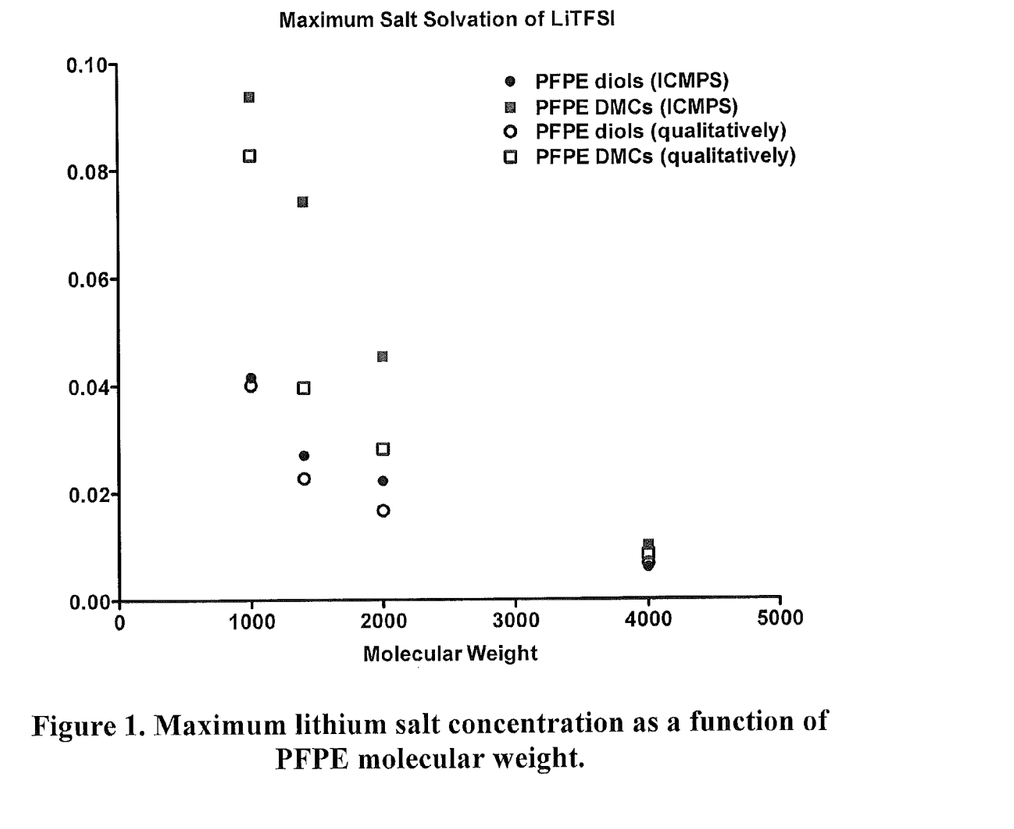
FIG. 1. Maximum lithium salt concentration as a function of PFPE molecular weight.
Figure 2:
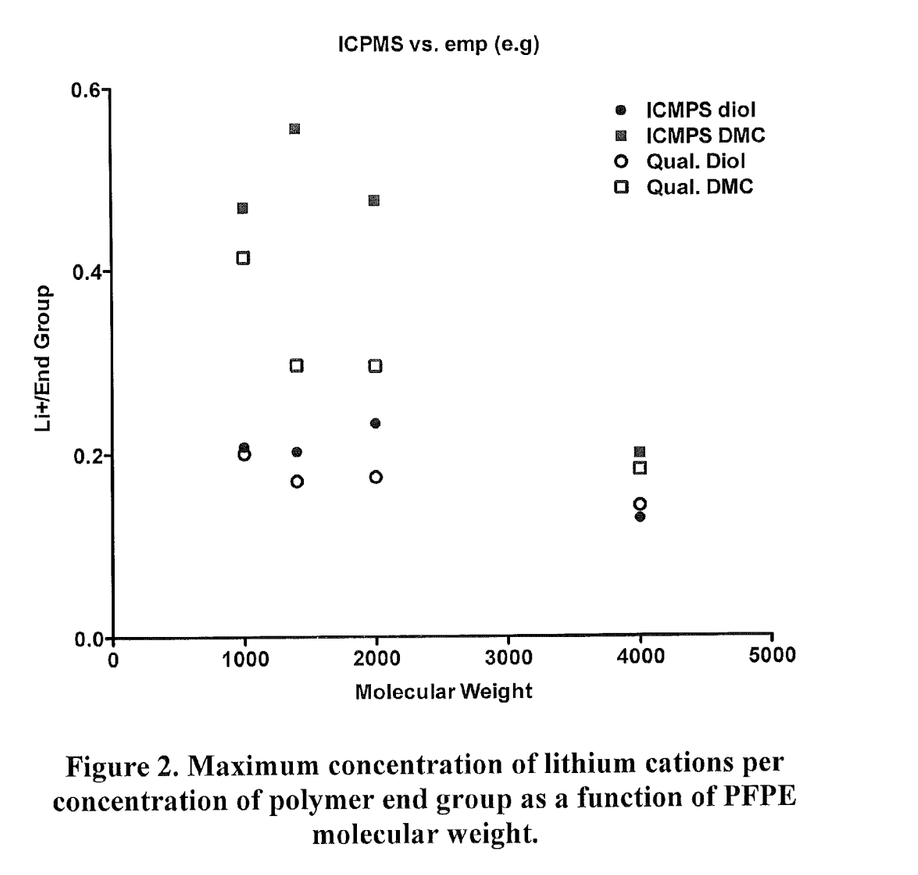
FIG. 2. Maximum concentration of lithium cations per concentration of polymer end group as a function of PFPE molecular weight.

As can be seen from FIG. 1, salt concentration, r, which can also be described as the ratio of [Li+] and ([$CF_2O$]+[$C_2F_4O$]/2) decays exponentially as molecular weight increases. Maximum salt concentration can also be described as the number of lithium ion per terminal group of each polymer chain as shown in FIG. 2. The trend is relatively linear, but there seems to be some variation between the ICPMS and qualitative method.

Example 7

Conductivity Measurements

Figure 3:
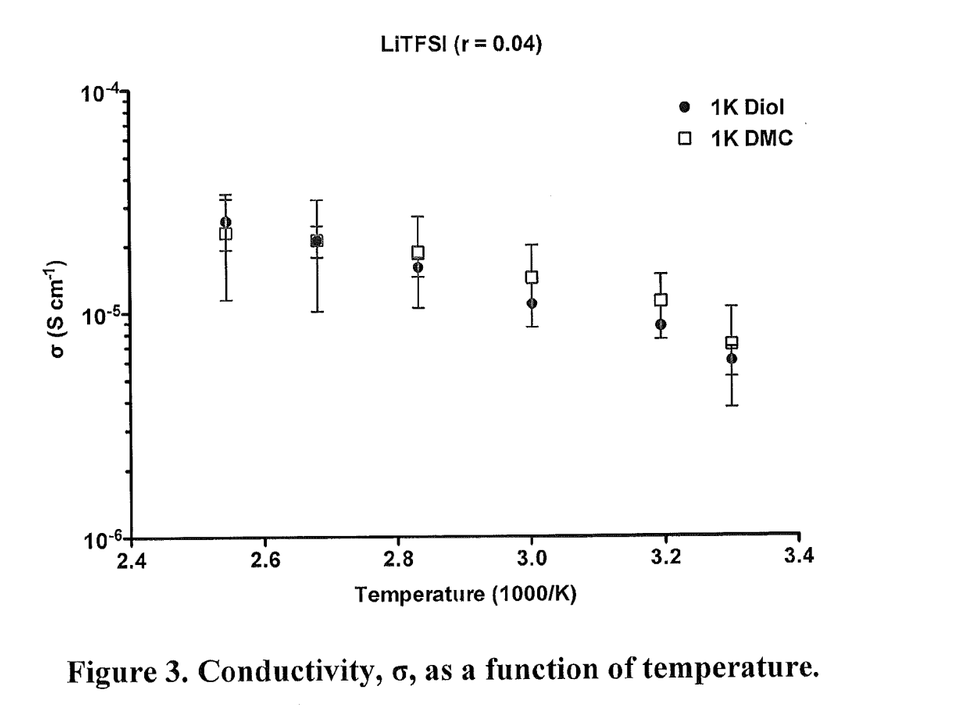
FIG. 3. Conductivity, σ, as a function of temperature of $PFPE_{1000}$-diol and $PFPE_{1000}$-dimethyl carbonate.
Figure 4:
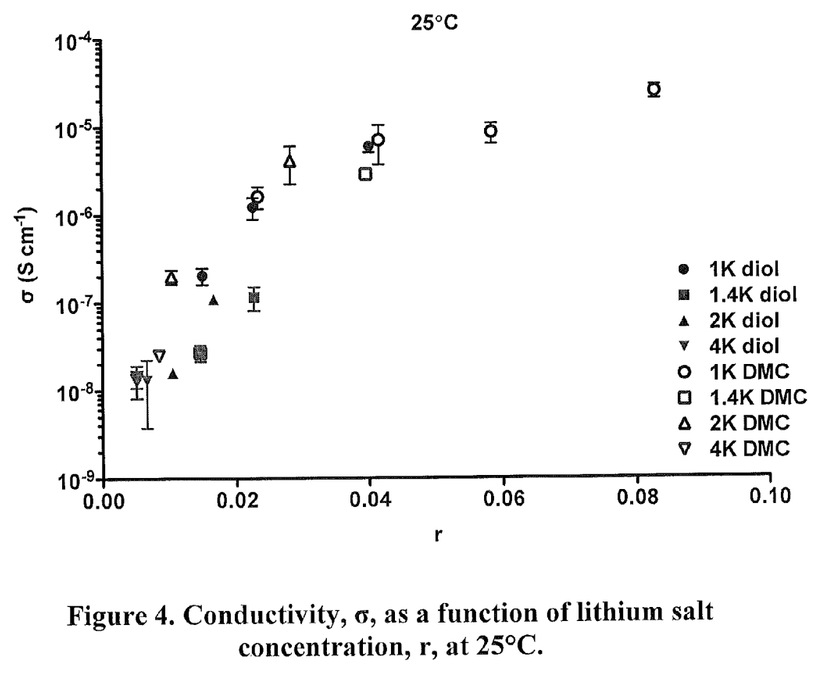
FIG. 4. Conductivity, σ, as a function of lithium salt concentration, r, at 25° C. of $PFPE_{1000}$-diol, $PFPE_{2000}$-diol, $PFPE_{1400}$-diol, $PFPE_{4000}$-diol and $PFPE_{1000}$-dimethyl carbonate, $PFPE_{2000}$-dimethyl carbonate, $PFPE_{1400}$-dimethyl carbonate, and $PFPE_{4000}$-dimethyl carbonate electrolytes.
Figure 5:
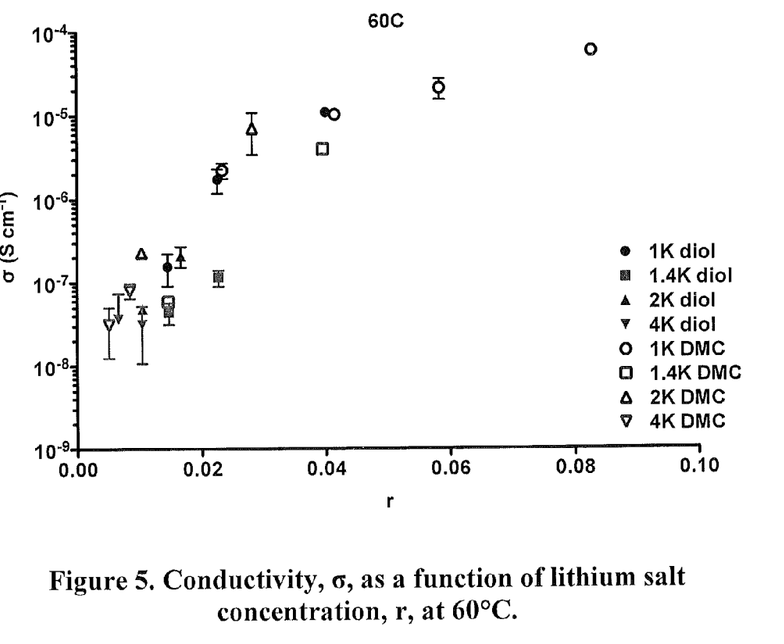
FIG. 5. Conductivity, σ, as a function of lithium salt concentration, r, at 60° C. of $PFPE_{1000}$-diol, $PFPE_{2000}$-diol, PFPE$_{1400}$-diol, PFPE$_{4000}$-diol and PFPE$_{1000}$-dimethyl carbonate, PFPE$_{2000}$-dimethyl carbonate, PFPE$_{1400}$-dimethyl carbonate, and PFPE$_{4000}$-dimethyl carbonate electrolytes.
Figure 6:
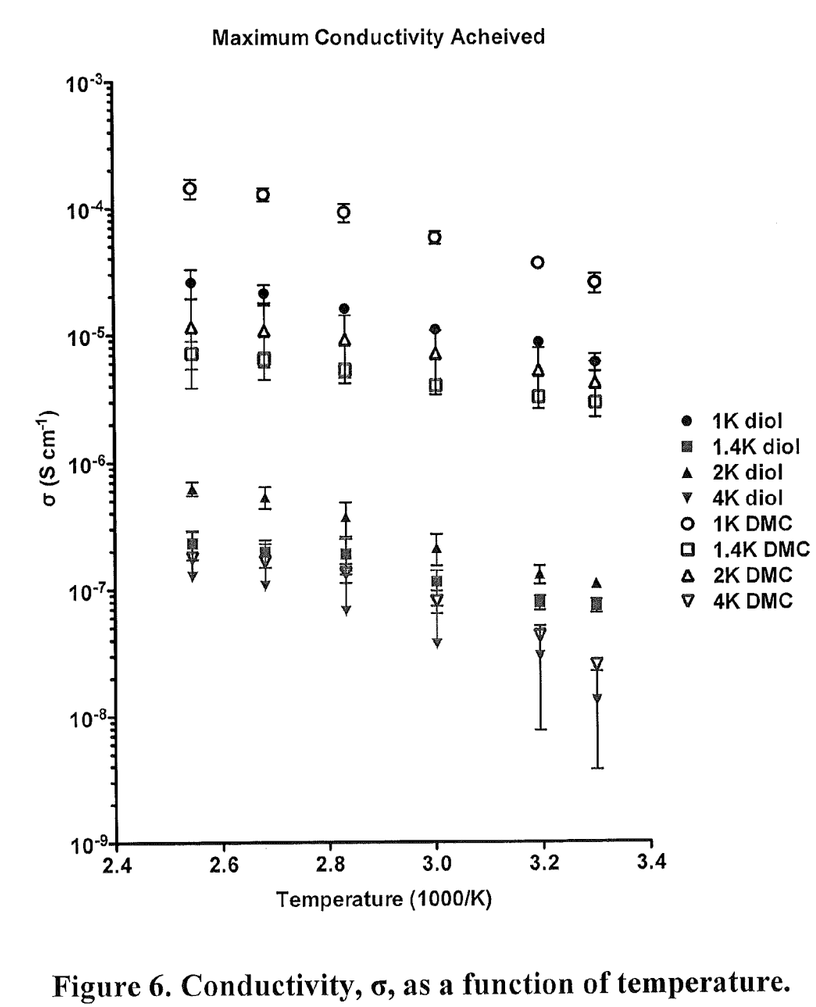
FIG. 6. Conductivity, σ, as a function of temperature of PFPE$_{1000}$-diol, PFPE$_{2000}$-diol, PFPE$_{1400}$-diol, PFPE$_{4000}$-diol and PFPE$_{1000}$-dimethyl carbonate, PFPE$_{2000}$-dimethyl carbonate, PFPE$_{1400}$-dimethyl carbonate, and PFPE$_{4000}$-dimethyl carbonate electrolytes at each respective maximum lithium salt concentration.
Figure 7:
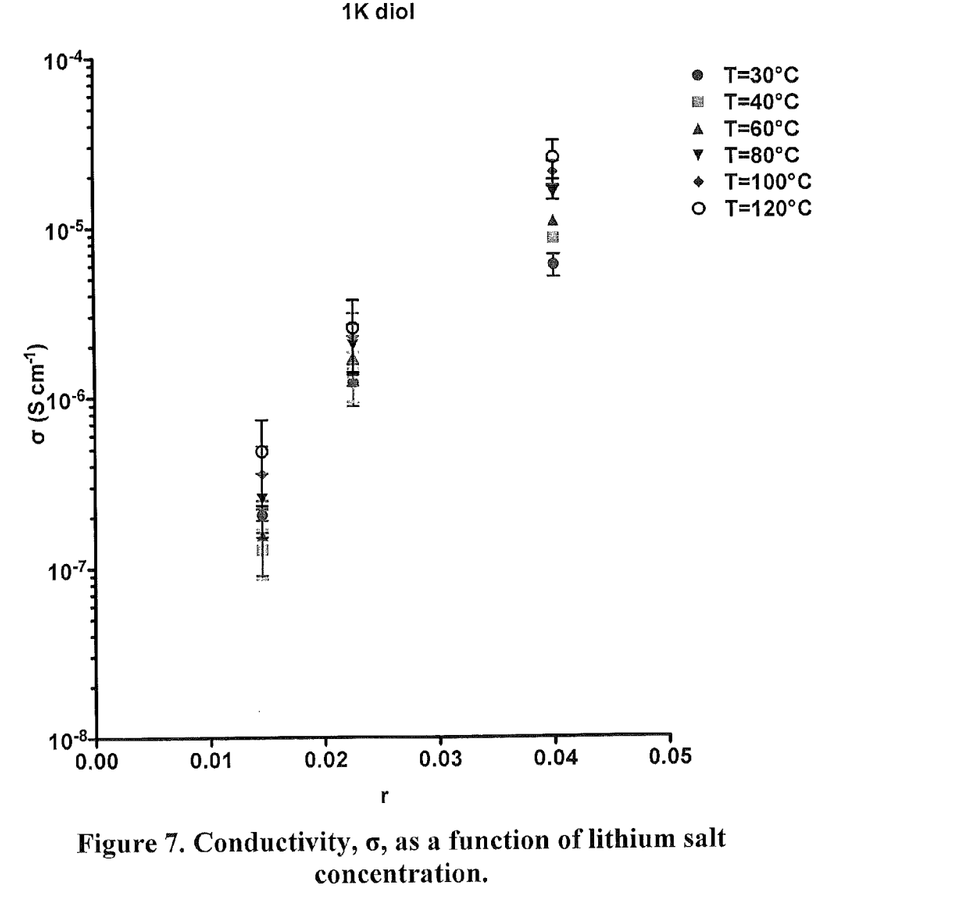
FIG. 7. Conductivity, σ, as a function of lithium salt concentration of PFPE$_{1000}$-diol at 30° C., 40° C., 60° C., 80° C., 100° C., and 120° C.
Figure 8:
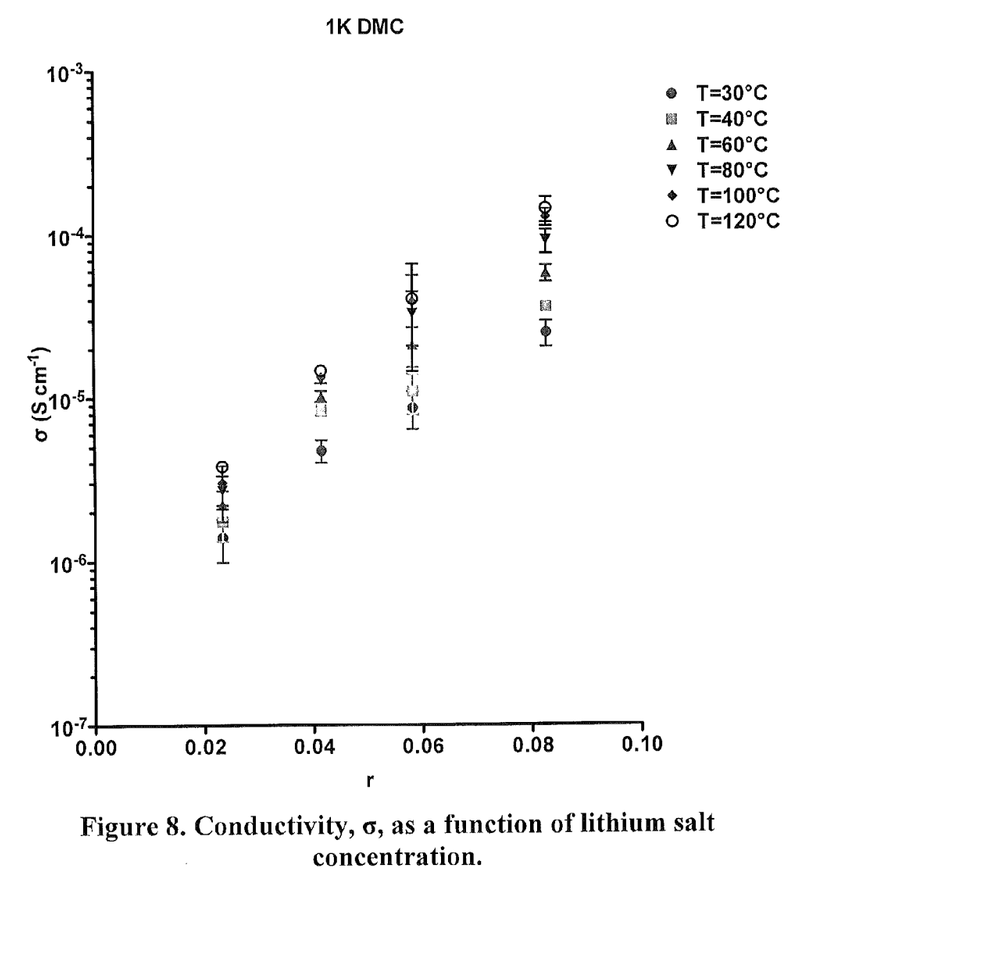
FIG. 8. Conductivity, σ, as a function of lithium salt concentration of PFPE$_{1000}$-dimethyl carbonate at 30° C., 40° C., 60° C., 80° C., 100° C., and 120° C.

At equal LiTFSI concentrations, the conductivity performance of PFPE 1K diol and PFPE 1K DMC are very similar (within error). This suggests that conductivity is facilitated dominantly with the backbone and not with the terminal group. (See FIG. 3). This is also observed with other PFPE molecular weights.

FIGS. 4-8 plot conductivity as a function of 'r' of all the different electrolytes studied (PFPE 1K-4K, two different end groups each). Generally a non-linear relationship is observed, reaching a plateau of approximately r=0.08. This trend can be observed at multiple temperatures (it is shown here at room temperature and at 60 degrees C.). This implies that optimal conductivity is achieved when the salt concentration of LiTFSI is closest to 0.08. Interestingly this value is also close to the LiTFSI concentration reported by the Balsara group previously at which greatest conductivity with PEO electrolytes can be achieved. At many molecular weights such a high salt concentration cannot be achieved, as opaque white solutions and subsequent salt precipitation is observed, so maximum conductivity achieved by each electrolytes is usually limited by solvation level. Therefore because larger molecular weight PFPEs solvate less LiTFSI, lower conductivities are observed.

The foregoing is illustrative of the present invention, and is not to be construed as limiting thereof. The invention is defined by the following claims, with equivalents of the claims to be included therein.

That which is claimed is:

1. A liquid or solid electrolyte composition, comprising:
   (a) a homogeneous solvent system, said solvent system comprising a compound of Formula I:

wherein:
   $R_f$ is a fluoropolymer having a weight average molecular weight of from 0.2 to 20 Kg/mol; and
   R' and R'' are each independently selected aliphatic, aromatic, or mixed aliphatic and aromatic groups; and
   (b) an alkali metal salt dissolved in said solvent system.

2. The composition of claim 1, wherein said alkali metal salt is a lithium salt.

3. The composition of claim 1, wherein said alkali metal salt is a sodium salt.

4. The composition of claim 1, wherein:
   said solvent system is included in said composition in an amount of from 70 to 95 percent by weight; and
   said salt is included in said composition in an amount of from 5 to 30 percent by weight.

5. A liquid or solid electrolyte composition, comprising:
   (a) a homogeneous solvent system, said solvent system comprising a compound of Formula II:

wherein:
   $R_f$ is a perfluoropolymer having a weight average molecular weight of from 0.2 to 20 Kg/mol; and
   R' is an aliphatic, aromatic, or mixed aliphatic and aromatic group; and
   (b) an alkali metal salt dissolved in said solvent system.

6. The composition of claim 5, wherein $R_f$ is a perfluoropolyether.

7. The composition of claim 1, further comprising an electrode stabilizing agent.

8. The composition of claim 1, wherein said composition is substantially free of volatile carbonate solvent.

9. The composition of claim 1, wherein said composition has a $T_g$ between $-120°$ C. and $-20°$ C.

10. The composition of claim 1, wherein said composition does not ignite when heated to a temperature of 235° C. and then contacted to a flame for 15 seconds in a Kohler open cup rapid flash test apparatus.

11. The composition of claim 1, wherein said composition has an electrochemical stability window of from 3 to 6 volts against $Li/Li^+$.

12. The composition of claim 1, wherein said fluoropolymer is amorphous.

13. A battery, comprising:
   (a) an anode;
   (b) a cathode; and
   (c) a liquid or solid electrolyte composition operatively associated with said anode and cathode, wherein said electrolyte composition is the composition of claim 1.

14. The battery of claim 13, wherein at least one of said anode and said cathode comprises a carbon electrode.

15. A fluoropolymer compound selected from the group consisting of Formula I and Formula II, wherein:
   $R_f$ is a perfluoropolyether having a weight average molecular weight of from 0.2 to 20 Kg/mol; and
   R' and R'' are each independently selected from aliphatic, aromatic, or mixed aliphatic and aromatic groups.

16. The fluoropolymer compound of claim 15, wherein the perfluoropolyether is amorphous.

17. The composition of claim 1, wherein $R_f$ is a perfluoropolymer.

18. The composition of claim 17, wherein $R_f$ is a perfluoropolyether.

19. The composition of claim 5, wherein:
   said solvent system is included in said composition in an amount of from 70 to 95 percent by weight; and
   said salt is included in said composition in an amount of from 5 to 30 percent by weight.

20. The composition of claim 5, wherein said perfluoropolymer is amorphous.

* * * * *

UNITED STATES PATENT AND TRADEMARK OFFICE
CERTIFICATE OF CORRECTION

| | |
|---|---|
| PATENT NO. | : 9,755,273 B2 |
| APPLICATION NO. | : 14/779460 |
| DATED | : September 5, 2017 |
| INVENTOR(S) | : DeSimone et al. |

It is certified that error appears in the above-identified patent and that said Letters Patent is hereby corrected as shown below:

On the Title Page

In the References:
(56) References Cited, Page 2, Other Publications, Proudmore et al.:
Please correct "1615-1625 (19951." to read -- 1615-1625 (1995). --

In the Specification

Column 6, Line 47: Please correct "N($R_c$)C(O)N$R_a$$R_b$" to read -- —N($R_c$)C(O)N$R_a$$R_b$ --

Signed and Sealed this
Third Day of April, 2018

Andrei Iancu
*Director of the United States Patent and Trademark Office*